(12) United States Patent
Carper

(10) Patent No.: US 6,256,690 B1
(45) Date of Patent: Jul. 3, 2001

(54) SYSTEM AND METHOD FOR FACILITATING MULTIPLE APPLICATIONS ON A SMART CARD

(76) Inventor: Todd Carper, 19672 Stevens Creek Blvd., Cupertino, CA (US) 95014

(*) Notice: Subject to any disclaimer, the term of this patent is extended or adjusted under 35 U.S.C. 154(b) by 0 days.

(21) Appl. No.: 09/450,028

(22) Filed: Nov. 29, 1999

Related U.S. Application Data
(60) Provisional application No. 60/116,243, filed on Jan. 15, 1999.

(51) Int. Cl.[7] ................................................ G06F 13/00
(52) U.S. Cl. ......................................... 710/102; 235/492
(58) Field of Search .................................. 710/100, 101, 710/102, 129; 235/487, 492, 380, 382, 383; 713/200, 187

(56) References Cited

U.S. PATENT DOCUMENTS

| | | | | |
|---|---|---|---|---|
| 5,544,246 | * | 8/1996 | Mandelbaum et al. | 705/65 |
| 5,802,519 | * | 9/1998 | De Jong | 707/100 |
| 5,923,884 | * | 7/1999 | Peyret et al. | 717/11 |
| 6,003,134 | * | 12/1999 | Kuo et al. | 713/200 |

* cited by examiner

Primary Examiner—Glenn A. Auve

(57) ABSTRACT

A system and method for facilitating the operation of multiple applications on a smart card are disclosed. One application may call another application, or leave a message for it. Applications are initialized, de-initialized (fully or partially), and re-initialized to accomplish inter-application operability.

30 Claims, 5 Drawing Sheets

SYSTEM AND METHOD FOR FACILITATING MULTIPLE APPLICATIONS ON A SMART CARD

CROSS REFERENCE TO RELATED APPLICATION(S)

This application claims the benefit of U.S. Provisional Application No. 60/116,243 filed Jan. 15, 1999.

FIELD OF THE INVENTION

The present invention relates to the field of portable tokens such as smart cards. More particularly, the present invention relates to a smart card capable of effectively running multiple applications.

BACKGROUND OF THE INVENTION

Most consumers are familiar with credit cards, debit cards, and automatic teller machine (ATM) cards. Such cards are increasingly used to access, transfer and spend money. The back of these cards includes a magnetic strip storing encoded information about the cardholder and the account(s) accessible by the card. Terminals, including ATMs and merchant point-of-sale terminals, read the encoded information from the card and access the cardholder's account to complete a transaction.

Besides the well-known credit and debit cards, stored value cards are becoming increasingly popular. Stored value cards are purchased or issued with a specific monetary value. When the cardholder desires to use the stored value card to purchase goods or services, the card is presented at the point of sale and the cost of the goods or services is deducted from the value of the card. The cardholder may continue to use the stored value card in this manner until all the value has been removed from the card. The card may then be discarded, or its value may be replenished. Such cards are commonly used to pay subway fares or to make long distance phone calls.

For many types of transactions, however, the current trend is away from credit/debit cards and stored value cards, and into a class of devices generally called smart cards. Rather than employing information encoded on a magnetic strip, smart cards include a microprocessor and a memory element embedded within a credit card size device. With a microprocessor, a smart card is able to interact with a greater variety of terminals across a broader range of transactions. In this broader range of transactions, the smart card is able to communicate more information regarding the cardholder, cardholder account, transaction authorization, etc.

The term "smart card" is used throughout as a convenient name for a broad class of devices sometimes referred to as portable tokens. Smart cards are the most common present form of portable tokens, but as will be seen hereafter the actual physical form of the portable token, as well as the specific means by which the portable token communicates data to the outside world are not the subject of the present invention.

Smart cards have been used in various applications for some time. FIG. 1 shows an exemplary smart card 1. Roughly the size of a credit card, smart card 1 includes a microprocessor 2 with an integral memory element, and conductive contacts 3. Microprocessor 2 is typically a single wafer integrated circuit mounted on, or embedded within the otherwise plastic smart card. Conductive contacts 3 interface with a terminal to electrically transfer data between the terminal and the smart card. Other embodiments of the smart card do not include conductive contacts 3. Such "contactless" smart cards receive information via proximately coupling, such as magnetic coupling, or via remote coupling, such as radio communication.

The microprocessor 2 and conductive contacts 3 of FIG. 1, are shown in some additional detail in FIG. 2. Conductive contacts variously include power contacts, at least one input/output (I/O) port, a reset port, and a clock (elk) signal port. Microprocessor 2 comprises a central processing unit (CPU) 9 which is generically control logic including I/O circuitry 4. Terminal signals variously interface with CPU 9 through the conductive contacts 3 and I/O circuitry 4. Microprocessor 2 is associated with a memory element 5. The "memory" may be formed on the same integrated circuit as the microprocessor, or may be formed on a separate device. Generally, the memory includes Random Access Memory (RAM) 6, Read Only Memory (ROM) 7, and read/write memory, such as an Electrically Erasable Programmable Read Only Memory (EEPROM) 8. However, some or all of these presently-used memory elements may be replaced by battery backed-up RAM, flash memory, or other electronic data storage media.

Operating power, a user input keypad, and a display for the smart card microprocessor are typically provided by a terminal. The term "terminal" broadly indicates any device exchanging information with a smart card using any type or number of data transfer means. A computer, ATM, merchant point-of-sale device, telephone, or security control device, are present examples of terminals.

A broad class of terminals nominally include a mechanism detecting the presence of a properly positioned smart card. Upon detecting the smart card, the terminal provides power to the microprocessor, and typically sends a reset (RST) signal to the smart card. The smart card uses the RST signal to reset itself, or to initiate an internal reset function. After reset, the smart card returns an answer-to-reset (ATR) signal to the terminal. The nature and protocol for the ATR signal is established by International Standards Organization (ISO) standard 7816. As established, the ATR is a multi-byte signal communicating basic information concerning the smart card to the terminal. Once such basic information is successfully recognized by the terminal, communication, i.e., data transfer, between the smart card and the terminal can be established.

Smart cards can be programmed to operate as stored value cards, credit cards, debit cards, ATM cards, calling cards, personal identity cards, critical record storage devices, etc. In these varied capacities, a smart card may be designed to use a number of different application programs. In actual practice, however, an inability to readily develop and operate applications from a variety of sources has limited the type and number of applications placed on the conventional smart card. In fact, most conventional smart cards include only a single application, or at most a single type of application.

This is not surprising when one considers that from programming and implementation perspectives conventional first generation smart cards are little more than an embedded application. That is, first generation cards can be viewed as an application which runs a set of microprocessor-specific instructions on hardware resources. The term "hardware resources" is used to generically indicate the memory and logic circuits, with their associated interfaces, used to execute microprocessor instructions but may also include I/O circuits, power circuits, and the other hardware. First generation smart card applications are written in a very low level, or machine level language. This language is specific to the microprocessor on which the application is intended to run.

Such conventional smart cards do not employ a true operating system. Rather, a specific application written according to the microprocessor instruction set is stored in ROM and executed in accordance with commands received from a terminal. MPCOS, VisaCash, GSM, and Proton are examples of such first generation embedded applications.

A true operating system does not execute commands received from the outside world. Thus, in the context of a smart card, a true operating system will not (is unable to) directly execute commands received from a terminal. Rather, an operating system serves as a conduit and router for commands communicated from a terminal to an application stored on the smart card. Additionally, an operating system serves as a conduit through which an application utilizes the hardware resources. In other words, an operating system provides I/O functions and provides other functionality to applications running on the OS. Since first generation smart cards store only the application code, and since this code must necessarily executes commands received from the terminal, first generation smart cards do not include an operating system. In an attempt to overcome the difficulties, limitations and expense associated with the programing of first generation smart cards, second generation smart cards incorporate an interpreter. An interpreter can be thought of as a library of commands. JAVA and BASIC are common interpreters. A set of commands is defined and identified in the interpreter, any one of which may be "called" by an application. The term "call" or "calling" is used throughout to broadly describe a relationship between two pieces of code in which one piece invokes the other. Commands, functions, definitions and instructions may be used by having one piece of code call another pieces of code. The foregoing pieces of code may reside within the an application or the OS.

Conceptually, an interpreter can be thought of residing between an application and the hardware resources of the smart card. Thus, an application running on a second generation smart card gains access to the hardware resources only through the interpreter which converts a command into one or more microprocessor instructions.

The interpreter effectively provides a higher level of abstraction and a programming language reflecting this level of abstraction with which a broader class of programmers may effectively write applications. However, the definition of commands by the interpreter, which promotes programming efficiency and standardization, necessarily restricts programing flexibility since an interpreter will never define the entire range of commands theoretically made possible by an unrestricted combination of the microprocessor instructions. Thus, by use of an interpreter programming flexibility is traded away for programming ease and standardization. The use of an interpreter also slows program execution since commands must be converted into microprocessor instructions before execution.

Further, since conventional smart cards implement the file structure defined by ISO-7816, part 4, the use of an interpreter comes as an additional penalty to programming flexibility. That is, ISO-7816, part 4 already confines an application programmer to a certain command set used to define a standard file architecture. On top of this restriction, the interpreter further confines the programmer to another fixed set of commands. If a particular functionality is not defined by a command in the interpreter's library, the functionality can not be implemented within an application.

As a result of their application-specific or interpreter/file structure-specific nature, first and second generation smart cards rarely incorporate more than one significant application. Where multiple applications are present on a conventional smart card, the applications are closely or commonly developed in order to successfully run together on the card. Until very recently, there has been no real ability to run multiple applications from different vendors on a single smart card.

However, at least one contemporary smart card architecture and system has been developed which allows multiple applications to run on a smart card using a true operating system. This smart card architecture and system are generally disclosed in commonly assigned U.S. patent applications Ser. Nos. 09/386,286; 09/386,287; 09/386,288; 09/386,289 and 09/386,290, all filed Aug. 31, 1999. Additional technical guidance is available from CrypTEC Systems, Inc. of Los Gatos, Calif.

This recent advance in the functional capabilities of smart cards now allows one smart card to implement and run multiple applications. The multiple applications need not be commonly designed or controlled in order to run on the smart card. Different vendors may freely write various applications so long as a very limited set of operating, interface, and data structure requirements are met. In effect, this advanced smart card creates an operating environment much like the environment presently associated with personal computers.

However, in order to realize the full range of benefits offered by the advanced smart card operating environment, inter-application functionality and communication must be facilitated. That is, one application must be able to call another application during a session. Further, applications must be able to securely communicate to another within the smart card operating environment.

SUMMARY OF THE INVENTION

The present invention provides a smart card system and method which effectively allow multiple applications to be run simultaneously and in cooperation one with another. In one aspect, the present invention provides a smart card comprising a microprocessor and a memory, where memory stores first and second applications. The memory further comprises a memory portion designated as a message box adapted to receive a message data object from at least the first application and adapted to communicate the message data object to at least the second application. The message data object may be provided with a digital signature authenticating the message data object.

In another aspect, the present invention provides a smart card comprising a microprocessor and a memory, where the memory stores an operating system and a plurality of applications. Further, the memory includes a memory portion accessible by only the operating system containing an Init-List indicating which applications in the plurality of applications have been initialized during a smart card session.

In yet another aspect, the present invention provides a method of operating multiple applications on a smart card comprising a microprocessor and a memory. The method comprises during a single smart card session; initializing a first application, de-initializing the first application, initializing a second application. In this method, the step of initializing the first application comprises forming a plurality of first application data objects in memory, and the step of de-initializing the first application comprises a partial de-initializing of the first application in which at least one of the plurality of first application data objects remains in memory during the session. This method may further comprise de-initializing the second application, and re-initializing the first application.

This method is particularly well adapted for use in the smart card where the memory comprises an Init-List indicating whether an application has been initialized during the session. Where the Init-List is present in memory, the method step of initializing the first application comprises updating the Init-List to indicate that the first application has been initialized. Further, the step of re-initializing the first application is performed in relation to an indication by the Init-List.

In still another aspect, the present invention provides a method of communicating a message from a first application to second application within a smart card. The method comprises initializing the first application, creating and storing a message data object, de-initializing the first application and calling the second application, initializing the second application, and collecting the message. As above, the message data object may include a digital signature authenticating the message data object.

The foregoing method is particularly well suited for use with a smart card having a read/write memory comprising a message flag indicating the presence of a pending message, and where the method step of initializing the second application interrogates this message flag. The read/write memory may also comprise a message box storing the message data object and a file directory storing a data record associated with the message data object.

DETAILED DESCRIPTION

Figure 1:
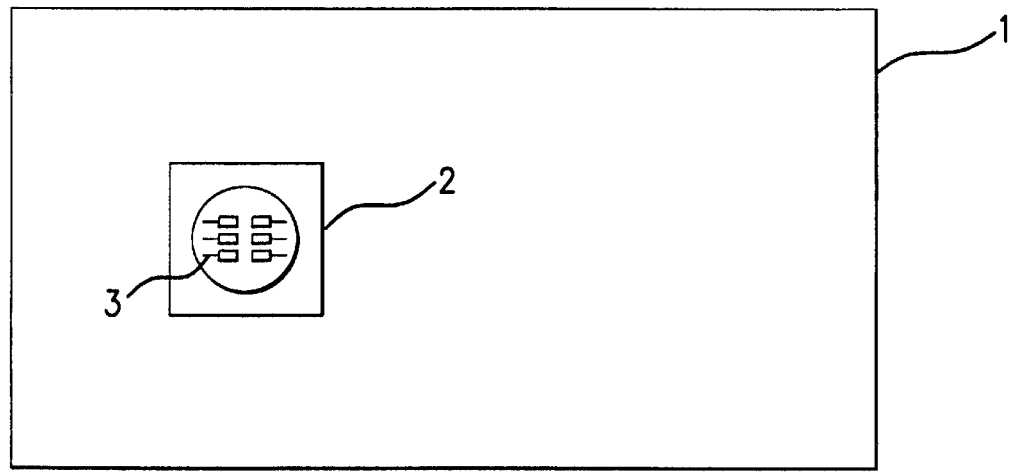
FIG. 1 shows an exemplary smart card.
Figure 2:
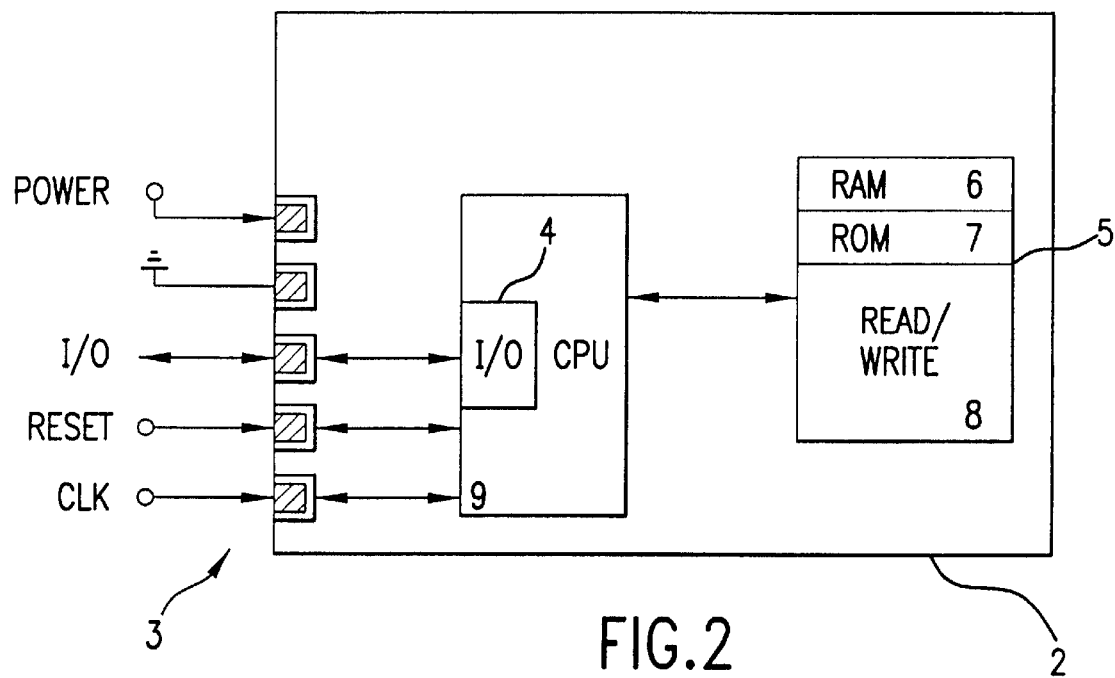
FIG. 2 shows the integrated circuit portion of the exemplary smart card of FIG. 1 in some additional detail.

As introduced in the foregoing sections the term "smart card" was described with reference to the common commercial device shown in FIG. 1. While this example serves well for the explanations which follow, it should be noted that the present invention is broadly applicable to a class of devices having physical form factors which are different from the one illustrated in the example. For example, the present invention is readily adapted to Secure Interface Modules (SIMS) and Secure Access Modules (SAMs). SIMs and SAMs are physically "cut-down" versions of the classic smart card and are used within telephones or other spaces smaller than that typically provided by larger terminals. Obviously, the size, shape, nature, and composition of the material encapsulating or mounting the microprocessor and memory element are not relevant or limiting to the present invention. Thus, as used in the description that follows and as claimed below, the term "smart card" should be broadly read as encompassing any self-contained combination of microprocessor and memory element capable of performing a transaction with another device. This other device is referred to as a terminal.

The term "application" generally refers to any programming code stored in the smart card which is capable of any independent functionality. Smart card applications typically respond to one or more commands from a terminal, and may implement a vast range of functions and processes. Many of these functions would benefit from cooperative associations with other smart card applications.

For example, a number of commercial transaction applications (ATM, retail charge card, etc.) may be designed to use a single personal-identification-number (PIN) application on the smart card. As a result, the smart card user need only remember a single PIN to access any one of the commercial transaction applications. At the same time, each commercial transaction application provider may rely on a sophisticated application without incorporating an independent authenticating means.

In another example, it is assumed that a smart card user has an investment account with a brokerage institution and a checking account with a local bank. By means of a first application the smart card is used as debit card to the checking account, and by means of a second application as a user authentication device to access the investment account. The smart card user desires to maintain as much money as possible in the high-yielding investment account while avoiding an overdraft of the checking account. Accordingly, the first application implementing the checking account functionality will "message" the second application controlling the investment account when funds should be transferred from the investment account into the checking account.

The range and associated benefits of inter-application communication and cooperation are limitless. The present invention provides a mechanism by which one application may call another application on the smart card. The present invention further provides a mechanism by which smart card applications may securely exchange information.

Before describing these mechanisms the concept of application initialization, de-initialization, and re-initialization will be discussed. Initialization is the process of activating an application or preparing it to receive the next command from a terminal. In effect, initialization is a process by which the smart card OS prepares an application for operation, and then designates the application to seize control of the smart card hardware and software resources. This process is further explained with reference to FIG. 3.

Figure 3:
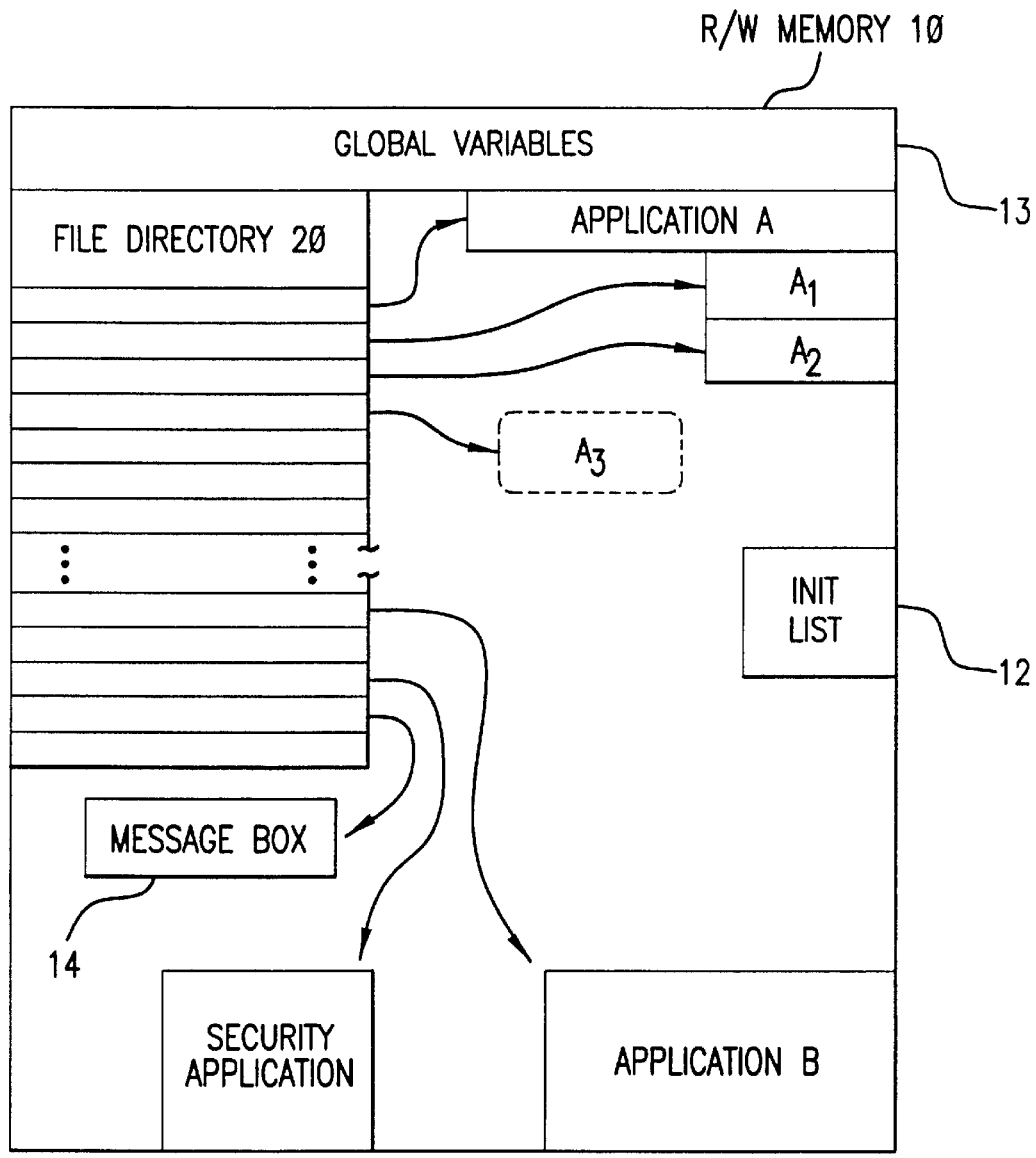
FIG. 3 conceptually illustrates a portion of smart card memory in the context of the present invention.
Figure 3:
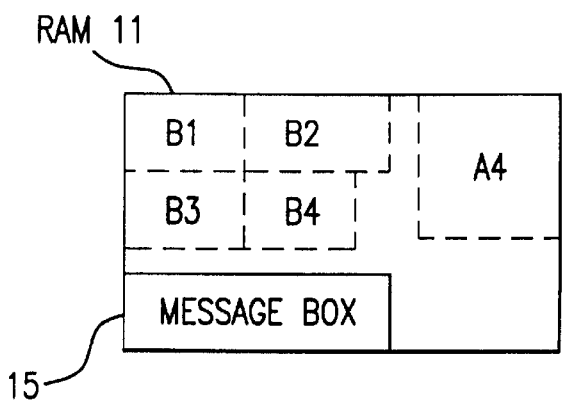

FIG. 3 conceptually illustrates the state of read/write (R/W) memory 10 and RAM 11 within a smart card memory. Read/write memory 10 comprises a reserve section for global variables 13 and a file directory 20. In one preferred embodiment, file directory 20 is a list (or linked set of lists) identifying every data object stored in read/write memory 10. Data objects stored in read/write memory 10 are persistent in memory when power is removed from the smart card. By comparison, data objects stored in RAM 11 are temporary since they are lost when power is lost.

The example shown in FIG. 3 assumes two applications (A and B) are stored in read/write memory 10. Like all data objects stored in read/write memory, applications A and B are identified in file directory 20. Applications A and B have previously been "installed" on the smart card. The process of installing an application on the smart card is described in commonly assigned U.S. patent application Ser. No. 09/386, 288 filed Aug. 31, 1999, the subject matter of which is incorporated herein by reference. While the example shows two applications stored in read/write memory, one or both of the applications might be stored in ROM.

When installed, some applications create related data objects which are stored in read/write memory. In the illustrated example of FIG. 3, A1 and A2 are such data objects. After being installed, an application remains dormant until "initialized" by the smart card OS. The smart card OS initializes an application when it first receives a command indicating the application during a "session." A session is defined as the period of time beginning when power is received in the smart card and ending when power is removed.

The initialization process for an application will vary according to the nature of the application. In the illustrated example, it is assumed that the initialization routine creates a temporary (or session) data object A3 stored in read/write memory 10 and a temporary data object A4 stored in RAM 11. Session data object A3 while stored in read/write memory is not intended to persist beyond the session. Temporary data object A4 by its presence in RAM is lost at least at the end of the session.

A session may terminate (shut-down) in one of two ways: controlled and uncontrolled. During a controlled shut-down the initialized (i.e., the running) application and/or the OS receive an indication from the terminal that the session is ending. When a controlled shut-down is indicated, the initialized application and/or the OS are able to finish uncompleted routines, update data objects or files, and generally clean-up memory space before the session ends.

An uncontrolled shut-down may occur for many reasons, such as intentional or unintentional loss of power. All uncontrolled shut-downs tend to leave read/write memory space cluttered with uncompleted routines and/or incorrect (non-updated) data objects. The effect of an uncontrolled shut-down on a smart card operating environment may be mitigated by use of a "transaction manager." Commonly assigned U.S. patent application Ser. No. 09/386,287 describes an effective transaction manager.

When an application is no longer in use, it should not place residual demands upon smart card resources—particularly memory resources which are scare. Thus, an application which creates a number of temporary (or session) data objects in read/write memory or RAM during operation will normally be required to remove such data objects during a controlled shut-down. This process of application de-initialization is a special form of the generic controlled shut-down.

In the illustrated example, application A (assumed to be running) is de-initialized when the OS receives a command intended for application B. The OS communicates this occurrence to application A, and application A prepares for shut-down. Temporary data objects A3 in read/write memory and A4 in RAM are removed thereby freeing valuable memory space for operation of application B. In effect, application A returns to its pre-initialization state in memory, awaiting a next initialization by the OS. This form of de-initialization is termed a "full de-initialization" since everything relating to the operative state of application A is shut-down and cleaned-up. No temporary data objects remain in memory.

A full de-initialization is normally desired when a smart card does not intend to call the application again during the session. This in not necessarily the case where a previously initialized application may be "re-initialized" during the session. In such circumstances, the initialized application will be "partially de-initialized" when another application is called during a session.

In the continuing example, we assume that application A is a primary or commonly used application. Further, we assume temporary data object A3 is a lengthy or complex data file generated when application A is initialized during a session. Thus, when application A is de-initialized it is desirable to maintain data object A3 in the event application A is re-initialized later in the session. In contrast, it is assumed that the RAM based temporary data object A4 may be easily regenerated during a re-initialization of application A. Accordingly, temporary data object A3 is retained in read/write memory while data object A4 is deleted from RAM during a partial de-initialization of application A.

Partial de-initialization allows for a quick and efficient re-initialization of an application. There is often a great deal of operating environment preparation or baseline data calculation during an initialization routine. The foregoing example is greatly simplified. Many data objects, file structures, subroutines or subordinated applications may be implicated in an initialization routine. In order to avoid repetition of much or all of the work required to prepare smart card resources to run an application, a partial de-initialization may be used.

While this capability offers significant performance benefits, it also creates a problem for the smart card OS. When the OS receives a command for a non-active application, it must determine whether the application requires initialization or re-initialization. If the newly indicated application has not been run during the session it requires a normal initialization. If, however, the indicated application has previously been run during the session, a re-initialization is required.

In order to make this decision, the OS requires a reference. This reference will be called an Init List 12. The Init List identifies application(s) previously initialized during the session. Thus, by comparing an ownership byte contained in the incoming command to a list of ownership bytes identifying applications previously run during the session, the OS may determine whether to initialize the called application or to re-initialize it.

Init List 12 is shown in the illustrated example as a persistent data object stored in read/write memory 10. However, it might be stored in RAM 11 or in the global variable section 13 of read/write memory 10. The Init List is controlled by the OS.

The partial de-initialization and re-initialization process is particularly useful in the context of one application calling another during a session. For example, we assume that application A in conjunction with the smart card hardware resources implements a normal level of computational capabilities sufficient to run a first security algorithm. Under most circumstances, this first level security algorithm is sufficient to verify the authenticity of terminal commands, user inputs, etc. However, under a limited but important set of other circumstances a much more powerful second security algorithm must be implemented. Rather than force application A to constantly run the longer and slower second security algorithm, application B is provided on the smart card. Application B implements the second security algorithm when needed.

Figure 4:
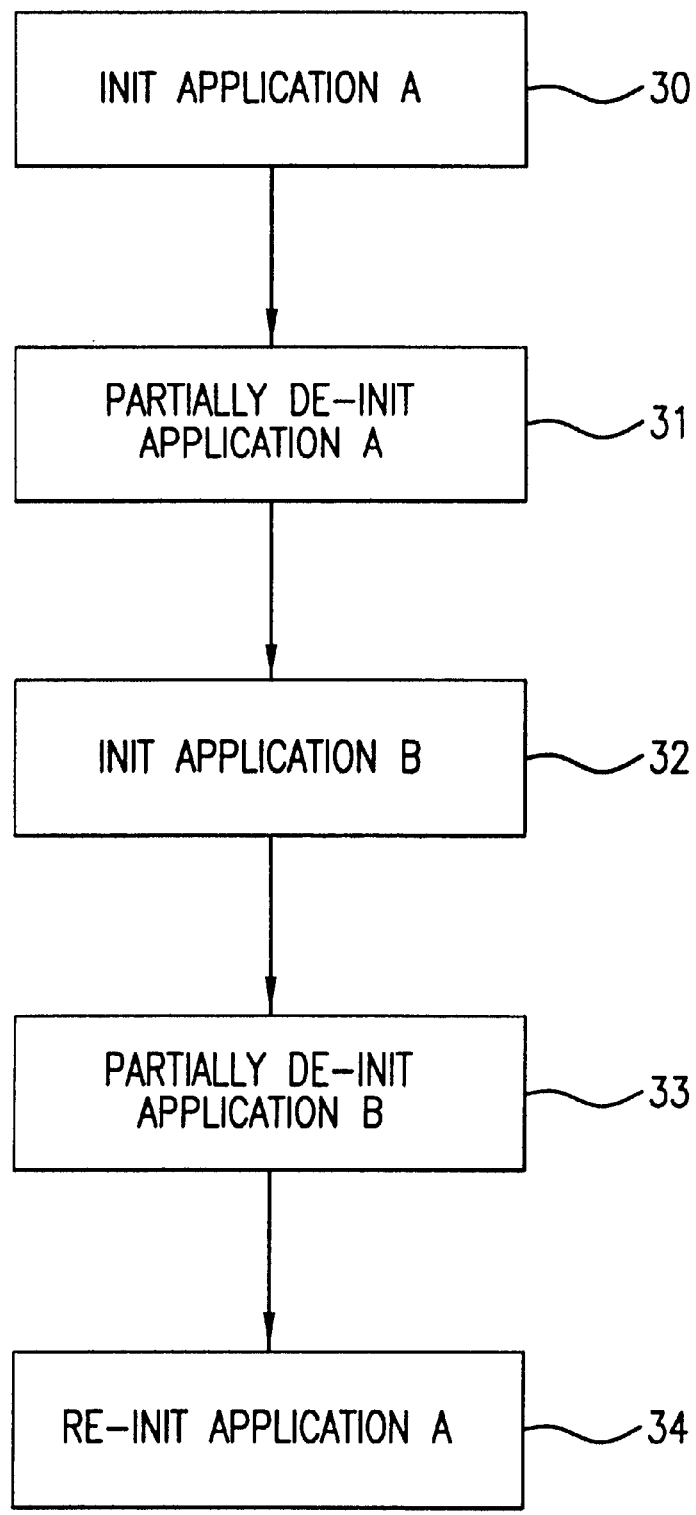
FIG. 4 is a flowchart further illustrating one aspect of the present invention.

Assuming these relationship, an example of cooperatively operating applications A and B according to one example of the present invention is illustrated in FIG. 4. First, application A in initialized 30. At some point during the operation of application A, application B is called. The call for application B may arise from a command within application A or from a terminal command received by the OS.

Upon receiving the command, application A having previously generated data objects A3 and A4 is partially de-initialized 31. During de-initialization, data object A3 is retained in read/write memory while data object A4 is allowed to be overwritten in RAM, and the Init List is updated to indicate that application A has been initialized during the session. Following de-initialization of application A, application B is initialized 32. (This step assumes that application B has not previously been run during the session).

Application B runs to form temporary data objects B1–B4 in RAM. It is assumed that data object B4 is required by application A. Following formation of the required data object, application B is partially de-initialized 33. During partial de-initialization of application B, temporary data object B4 is retained in RAM and the Init List is updated to indicate that application B has been initialized during the session. Finally, application A is re-initialized 34. Once re-initialized application A may continue using data object B4.

The foregoing example assumes that application B might be re-initialized during the session. If application B typically runs only once per session to calculate temporary data object B4 then upon completion application B would undergo a full de-initialization.

In this manner, an application running on a smart card may effectively suspend operation while retaining the operating environment established during initialization and preserving desired temporary data objects. At the same time, smart card resources may be selectively freed to allow another application to run. Partial de-initialization and re-initialization of the first application allow the second application to "interrupt" the first application without a dramatic loss in previously prepared smart card resources.

Interrupting applications are common in higher order computing environments. They are exceptionally useful in prioritizing the operation of multiple applications within a single environment. Interrupting applications allow minor security faults or other processing errors to be corrected in a timely manner by specialized applications. However, conventional smart cards have never enabled such finctionality. The present invention provides a mechanism whereby interrupts may be effectively handled during the normal flow of an application without a dramatic loss of application data.

In the example above, application B was called within application A to create a specialized data object (B4). Data object B4 may be left in RAM or stored in read/write memory. Similarly, application B might access temporary data object A3 during the calculation of data object B4. So long as the ownership byte associated with a data object allows, any application may access the data object.

Data may also be exchanged between two or more applications outside of a formal cooperative relationship, such as the one described above. For example, two applications incapable of calling one another may nevertheless exchange information. The generic ability to communicate information from one application to another within the smart card operating environment is called "messaging."

Messaging is accomplish using a message box. A message box is designated location in RAM and/or in read/write memory. FIG. 3 conceptually illustrates a first message box 15 in RAM 11 and a second message box 14 in read/write memory 10. One application may "drop" a message data object in the message box during a session. Later, during the same session or in a subsequent session, another application may "collect" the message data object. Of course, in order to be persistent beyond the current session the message data object must be stored in read/write memory and be associated with a data record in the file directory.

Figure 5:
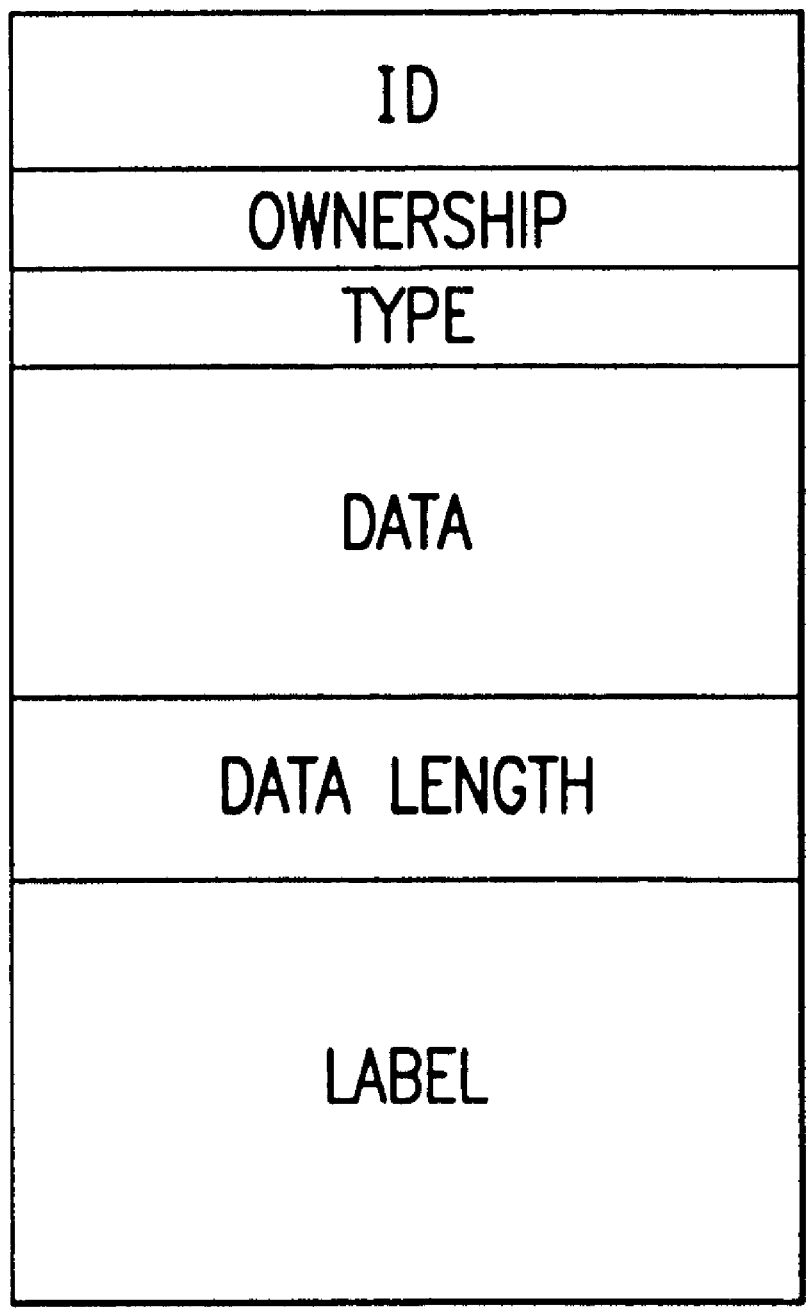
FIG. 5 is an exemplary structure for a data record useful within the context of the present invention; and, FIG. 6 is a flowchart further illustrating another aspect of the present invention.

FIG. 5 illustrates an exemplary 16-byte data record structure 50 comprising a 2-byte ID field, a 1-byte ownership field, a 1-byte type field, a 4-byte data field, a 2-byte data length field, and a 6-byte label field. As presently preferred the type field and the label field are user definable. That is, an application's developer may use these data record fields for any purpose whatsoever. The memory manager, and the OS in general, do not care what these fields contain. They are merely variable data fields associated with a data record. As examples, the type field might indicate whether the data record is an application, a file, or some other data object. The label field might indicate an access type or condition for the data record.

The ID field identifies the data record within the file system administered by the OS. The ownership field includes ownership information. In the present example, the ownership field of the data record contains the unique ownership byte previously described. Only the OS may access and define the ID and ownership fields in each data record.

The data field and the data length field are related within each data record. The data length field specifies the size of the data field. In this embodiment, the data field is allocated 4 bytes, it's maximum data size. Thus, if the data length field indicates that the data is 4 bytes or less in size, then the data field stores the actual data associated with the data record. If, however, the data length field indicates that the data field is greater than 4 bytes in size, the data field stores a 4-byte data pointer indicating the beginning address, elsewhere in read/write memory at which the actual data may be found.

Thus, assuming use of this particular data record structure, a message data object stored in read/write memory having a size 4 bytes or less in size will store the data in the data record. A message data object having a size greater than 4 bytes will have a corresponding data record in which the data field stores a 4 byte address vector to the location storing the actual message data.

The message data stored in the message box may include a digital signature or similar authentication device. The application dropping off the message will code and attached the digital signature to the message data, and the application collecting the message will decode the digital signature to verify the authenticity of the message data. In this manner, data may be securely exchanged between applications.

Once a first application creates a drops off a message, it may immediately send the message by calling a second application. This process is illustrated in FIG. 6.

Figure 6:
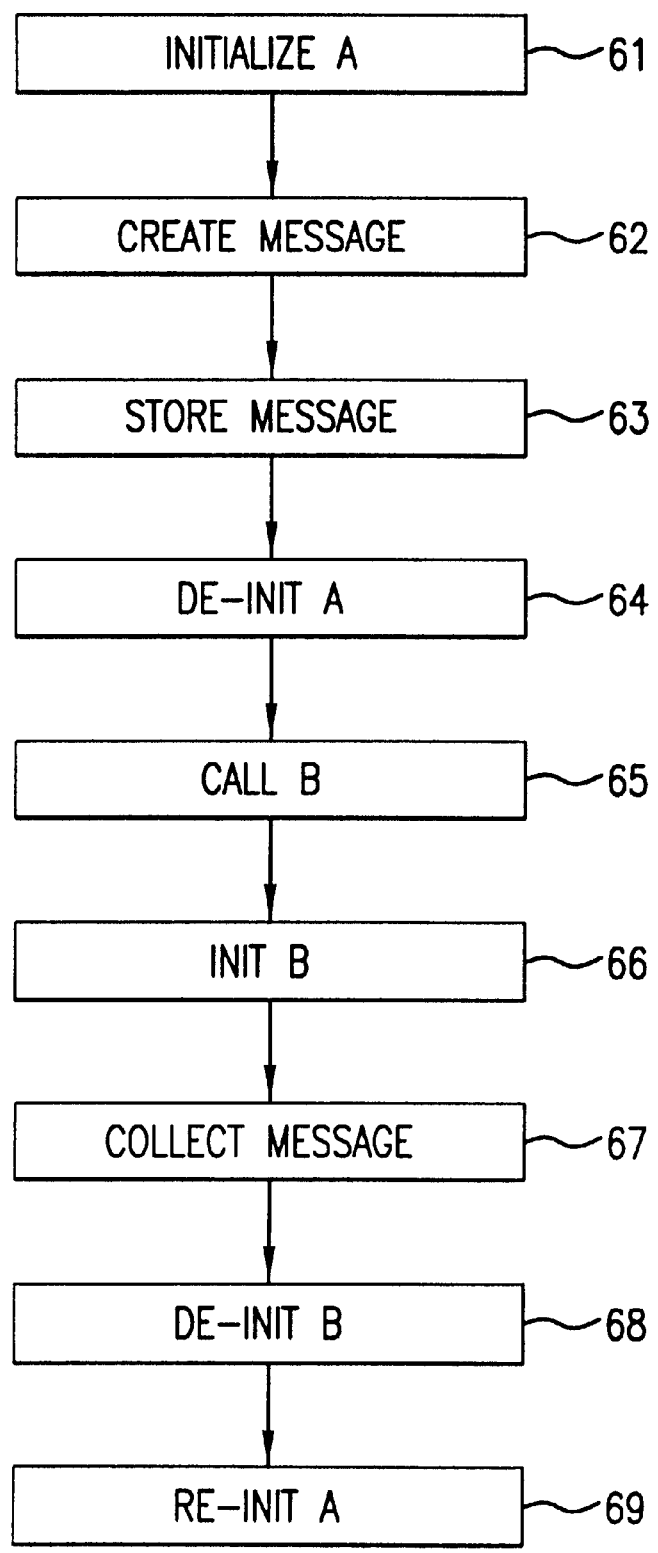

In FIG. 6, a first application (A) is called and initialized 61. While running, application A creates a message 62 and stores it in memory box 14 (of FIG. 3) 63. In order to immediately "send" the message to a second application (B), application A partially de-initializes 64 and calls application B 65. When initialized 66, application B collects the pending message 67. Once application B has finished running, it de-initializes 68 and call application A, which is re-initialized 69.

The presence of a pending message may be determined by the "collecting" application in several ways. A message flag set by the "dropping-off" application may be poled during initialization. This message flag may be placed in the reserve section of read/write memory. Alternatively, an application may scan the file directory looking for one or more data records having a "message" indicator in the type field and the appropriate ownership data in the ownership field. Such data records indicate messages to the application.

Some message boxes may be designated for broadcast messages. A broadcast message may be collected (read) by all application upon their initialization, and/or re-initialization. A broadcast message may communicate smart card resource state information or security information to the applications.

Messages need not be immediately sent like the example illustrated in FIG. 6. Rather, some messages may be created and stored in read/write memory where they remain pending until a certain application is called or a certain set of circumstances arises. Like other data objects, a message may be persistent in memory so long as an associated data record is stored in the file directory. Like other data objects, when no longer needed (i.e., after being read or used), a message may be deleted and the space once allocated to message data object may ve recycled for use in the smart card operating environment.

The foregoing capabilities allow multiple applications to operate more effectively operate on the same smart card. One application may derived the benefits and utilize the functionality of other application(s). Use of the initialization, de-initialization (partial or full), and reinitialization mechanisms described above facilitates inter-application cooperation and communication. In one embodiment, the OS uses a Init List to track which applications have been initialized in a given session. Based on the information in the Init List, as communicated to an application by the OS, the application will determine whether a full initialization is required or whether a re-initialization is required.

Information in any reasonable form or size may be communicated between applications using the messaging mechanism described above. Messages may be stored in RAM and/or in read/write memory. Messages stored in read/write memory may be persistent.

The present invention has been described by means of several hypothetical example and presently preferred embodiments. These are only examples. The present invention is not limited to these examples, but is defined by the attached claims.

What is claimed:

1. A smart card comprising a microprocessor and a memory,
   the memory storing first and second applications, and further comprising:
   a memory portion designated as a message box adapted to receive a message data object from at least the first application and adapted to communicate the message data object to at least the second application.

2. The smart card of claim 1, wherein the message data object comprises a digital signature authenticating the message data object.

3. The smart card of claim 2, wherein the memory further comprises a read/write memory containing the memory portion.

4. The smart card of claim 2, wherein the memory further comprises a RAM containing the memory portion.

5. The smart card of claim 1, wherein the memory further comprises a read/write memory; and,
   wherein the portion of memory designated as a message box is located in read/write memory, such that a message data object stored therein is persistent in memory.

6. The smart card of claim 5, wherein the read/write memory further comprises a file directory comprising an entry identifying the message data object.

7. A smart card comprising a microprocessor and a memory, the memory storing an operating system, and a plurality of applications, and further comprising:
   a memory portion accessible by only the operating system containing an Init-List indicating which applications in the plurality of applications have been initialized during a session.

8. The smart card of claim 7, wherein the memory further comprises a read/write memory, and wherein the memory portion accessible by only the operating system is located in read/write memory, such that the Init-List stored therein is persistent in memory.

9. The smart card of claim 8, wherein the read/write memory further comprises a file directory comprising an entry identifying the Init-List.

10. A method of operating multiple applications on a smart card, the smart card comprising a microprocessor and a memory, the method comprising in a single session:
    initializing a first application, such that a plurality of first application data objects are formed in memory;
    partially de-initializing the first application, such that at least one of the plurality of first application data objects remains persistent in memory during the session; and,
    initializing a second application.

11. The method of claim 10, further comprising:
    de-initializing the second application: and
    re-initializing the first application.

12. The method of claim 10, wherein the memory comprises an Init-List indicating whether an application has been initialized during the session, and
    wherein the step of initializing the first application comprises updating the Init-List to indicate that the first application has been initialized.

13. The method of claim 12, wherein the step of re-initializing the first application is performed in relation to an indication by the Init-List.

14. The method of claim 13, wherein the memory stores an operating system exclusively accessing the Init-List.

15. The method of claim 10, wherein the memory comprises a read/write memory portion and a random access memory (RAM) portion, and wherein the step of initializing the first application comprises:
    storing session persistent, first application data objects in memory;
    forming non-persistent, first application data objects in memory.

16. The method of claim 15, wherein the session persistent, first application data objects are stored in either the read/write portion of memory or the RAM portion, and the non-persistent, first application data objects are stored in the RAM portion.

17. The method of claim 15, wherein the step of partially de-initializing the first application comprises:
    permitting memory allocated to the non-persistent, first application data objects to be overwritten during the step of initializing the second application.

18. A method of communicating a message from a first application to second application within a smart card, the method comprising:
    initializing the first application;
    creating and storing a message data object;
    de-initializing the first application and calling the second application;
    initializing the second application; and
    collecting the message.

19. The method of claim 18, wherein the smart card comprises a read/write memory and a RAM.

20. The method of claim 19, wherein the message data object is stored in one of read/write memory or RAM.

21. The method of claim 20, where the message data object is stored in a message box portion of one of read/write memory or RAM.

22. The method of claim 19, wherein the message data object comprises a digital signature authenticating the message data object.

23. The method of claim 19, wherein the read/write memory comprises a message flag indicating the presence of a pending message; and wherein the step of initializing the second application comprises interrogating the message flag.

24. The method of claim 19, wherein the read/write memory comprises a message box storing the message data object and a file directory storing a data record associated with the message data object.

25. The method of claim 24, wherein the data record associated with the message data object comprises an address vector indicating a location in read/write memory at which the message data object is stored.

26. A method of communicating a message between first and second applications stored in a smart card memory, the smart card memory comprising; Read-Only-Memory (ROM), and non-volatile Read/Write (R/W) memory, and the method-comprising:

upon initializing the smart card at the beginning of a session, forming a file directory in R/W memory;

initializing the first application and creating a message data object by means of the first application;

storing the message data object in memory and creating a data file in the file directory identifying the message data object; and, creating a message indicator in R/W memory.

27. The method of claim 26, further comprising:

de-initializing the first application, and initializing the second application;

upon detecting the message indicator in R/W memory, searching the file directory for the data file identifying the message data object.

28. The method of claim 27, wherein the message indicator is created in a portion of R/W memory set aside for global variables.

29. The method of claim 27, wherein the data file comprises a type field indicating the content of the data file as a message.

30. The method of claim 27, wherein the data file comprises a type field indicating the content of the data file as a broadcast message.

* * * * *